(12) United States Patent
Ko et al.

(10) Patent No.: US 6,804,451 B1
(45) Date of Patent: Oct. 12, 2004

(54) METHOD AND VIDEO RECORDING APPARATUS FOR RECORDING A TELEVISION PROGRAM

(75) Inventors: Jung-Wan Ko, Yongin; Hee-Wan Lee, Suwon; Jang-Hun Ru, Seoul; Jea-Chun Ru, Suwon; Myoung-Jong Song, Suwon; Seung-Man Kim, Suwon; Gyeong-Chan Park, Suwon, all of (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

(21) Appl. No.: 09/000,928

(22) Filed: Dec. 30, 1997

(30) Foreign Application Priority Data

Aug. 6, 1997 (KR) ............................................. 97/37546

(51) Int. Cl.[7] ................................................. H04N 5/91
(52) U.S. Cl. .......................................... 386/83; 386/112
(58) Field of Search ............................... 386/46, 83, 95, 386/109, 111, 112, 125; 348/5, 906; H04N 5/76

(56) References Cited

U.S. PATENT DOCUMENTS

| 4,841,132 | A | * | 6/1989 | Kajitani et al. ................ 386/83 |
| 4,899,370 | A | * | 2/1990 | Kameno et al. ............... 386/83 |
| 5,315,452 | A | * | 5/1994 | Hong .......................... 386/46 |
| 5,381,275 | A | * | 1/1995 | Nitta et al. .................. 386/112 |
| 5,390,027 | A | * | 2/1995 | Henmi et al. ................. 386/83 |
| 5,488,409 | A | * | 1/1996 | Yuen et al. ................... 386/83 |
| 5,517,321 | A | * | 5/1996 | Yoshida ........................ 386/96 |
| 5,543,933 | A |   | 8/1996 | Kang et al. |
| 5,594,598 | A | * | 1/1997 | Shikakura .................... 386/109 |
| 5,661,526 | A | * | 8/1997 | Hamamoto et al. ......... 348/465 |
| 5,686,954 | A | * | 11/1997 | Yoshinobu et al. ......... 348/906 |
| 5,758,009 | A | * | 5/1998 | Hashimoto et al. ........... 386/83 |
| 5,809,204 | A | * | 9/1998 | Young et al. .................. 386/83 |
| 5,870,523 | A | * | 2/1999 | Kikuchi et al. .............. 386/125 |
| 6,167,188 | A | * | 12/2000 | Young et al. .................. 386/83 |
| 2002/0012525 | A1 |  | 1/2002 | Yuen et al. |

FOREIGN PATENT DOCUMENTS

| EP | 0584991 A2 |   | 3/1994 |
| EP | 0802682 A1 | * | 10/1997 |
| JP | 63-308757 |   | 12/1988 |
| JP | 6-76474 |   | 3/1994 |
| JP | 8-17137 |   | 1/1996 |
| JP | 8-65616 |   | 3/1996 |
| JP | 8-124243 |   | 5/1996 |

* cited by examiner

Primary Examiner—Huy Nguyen
(74) Attorney, Agent, or Firm—Staas & Halsey LLP.

(57) ABSTRACT

A video recording apparatus to record a television program with an optimal quality according to a residual quantity of a recording medium and a method therefor. The video recording apparatus detects the residual quantity of the recording medium and a running time of the television program to be recorded on the recording medium, to determine an optimal image compression ratio. Then, the video recording apparatus records the television program based on the determined optimal image compression ratio, making the best use of the residual quantity of the recording medium.

38 Claims, 2 Drawing Sheets

METHOD AND VIDEO RECORDING APPARATUS FOR RECORDING A TELEVISION PROGRAM

BACKGROUND OF THE INVENTION

1. Field of the Invention

The present invention relates to a video recording apparatus for recording a television program, and more particularly, to a method for comparing a running time of the television program to be recorded with a residual quantity of a recording medium, so as to record the television program on the recording medium with an optimal image compression ratio.

2. Description of the Related Art

In general, a broadcasting station provides a broadcasting program information service, such as KBPS (Korea Broadcasting Program Service) in the Republic of Korea. For that purpose, the broadcasting station broadcasts the television program together with broadcasting program information which includes a televising time, a running time and a classification of the television program, and the name of the broadcasting station, etc.

Upon receiving the broadcasting program information broadcast from the broadcasting station, a video recording apparatus, such as a video cassette recorder (VCR) or a digital video disc (DVD) system combined with a television receiver, detects the televising time of the television program to punctually record the television program on a recording medium. Further, the video recording apparatus determines the type and residual quantity of the recording medium on which the television program is to be recorded and a recording mode selected by a user, to determine a recording mode in which the television program is to be recorded, or to generate a warning message in case the residual quantity of the recording medium is not enough to fully record the television program. Commonly, the video recording apparatus compresses an image signal of the television program based on a particular fixed image compression ratio to record the compressed image signal on the recording medium regardless of the residual quantity.

The conventional video recording apparatus records the television program simply based on the type of the recording medium, and the recording mode selected by the user, to the extent of the residual quantity of recording medium. Thus, even in case the residual quantity of the recording medium is large enough, the image signal of the television program is compressed with the fixed image compression ratio, so that the recording medium may have an unrecorded residual portion. However, the unrecorded residual portion is commonly too short to record a new television program thereon, so that the residual portion may be wasted undesirably. Besides, since the television program is compressed with the fixed image compression ratio, the television program can not be recorded with an optimal quality, even in case the recording medium has a sufficient residual quantity.

Thus, the video recording apparatus records the television program in full only when the residual quantity of the recording medium is larger than or equal to the running time of the television program. However, when the residual quantity is somewhat smaller than the running time, a warning message is generated to indicate not to perform the recording operation. In this instance, if the recording operation is performed anyway, the end portion of the television program is not recorded on the recording medium.

SUMMARY OF THE INVENTION

It is therefore an object of the present invention to provide a method for recording a television program on a recording medium, making the best use of a residual quantity of the recording medium.

It is another object of the present invention to provide a method for recording a television program with an optimal quality according to a residual quantity of a recording medium.

Additional objects and advantages of the invention will be set forth in part in the description which follows and, in part, will be obvious from the description, or may be learned by practice of the invention.

The foregoing objects of the present invention are achieved by providing a video recording apparatus which receives broadcasting program information transmitted from a broadcasting station; detects a running time of the television program to be recorded from the broadcasting program information; detects a residual quantity of a recording medium on which the television program is to be recorded; compares the running time of the television program with the residual quantity of the recording medium to determine an optimal image compression ratio; and records the television program on the recording medium based on the optimal image compression ratio.

Further, the video recording apparatus checks whether or not the residual quantity is large enough to fully record the television program; records the television program on the recording medium based on the optimal image compression ratio, if the residual quantity is sufficient to record the television program; and displays a warning message, if the residual quantity is not sufficient to record the television program.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF THE PREFERRED EMBODIMENTS

Preferred embodiments of the present invention will be described in detail hereinbelow with reference to the attached drawings. Further, it should be clearly understood that many specifics such as the detailed circuit elements are shown only by way of an example to bring a better understanding of the present invention and the present invention may be embodied without those specifics. Moreover, it should be noted that detailed descriptions on the related prior art may be intentionally omitted if it is believed to be unnecessary in describing the concepts of the present invention.

Figure 1:
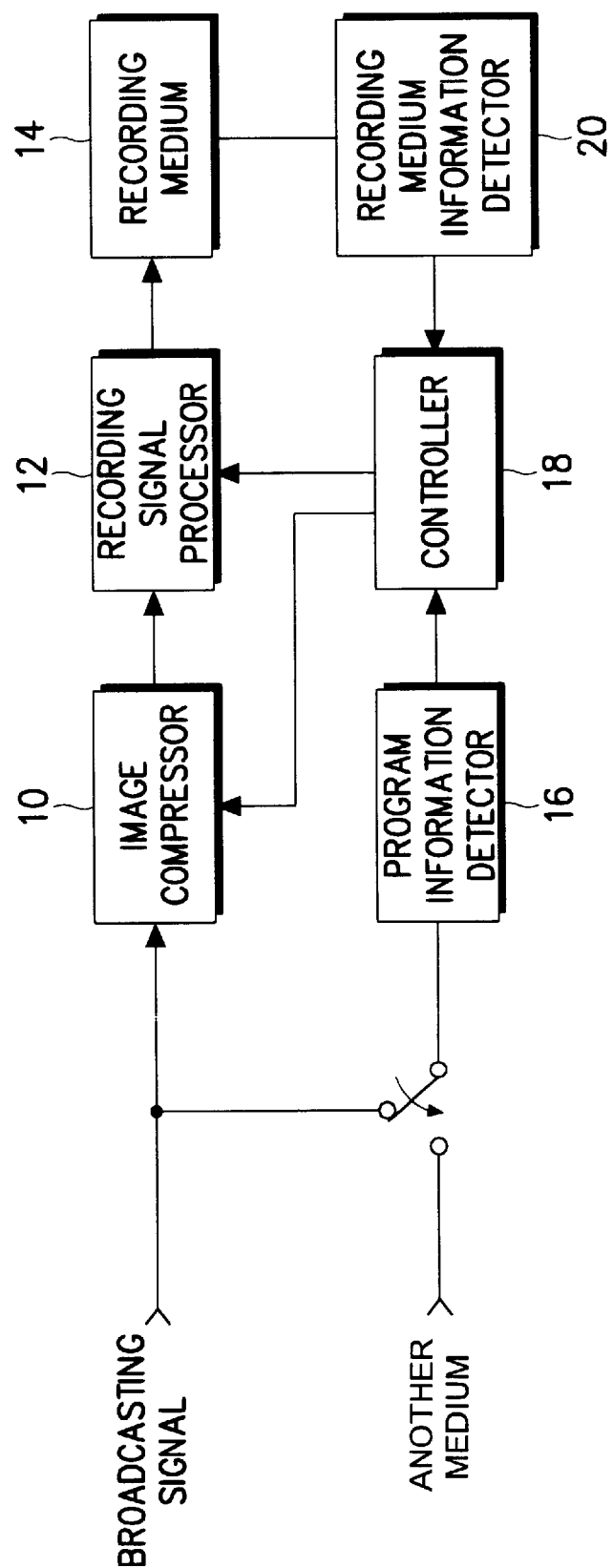
FIG. 1 is a schematic block diagram of a general video recording apparatus for recording a television program according to an embodiment of the present invention.

FIG. 1 illustrates a general video recording apparatus for recording a television program, to which the present invention is applicable. As illustrated, a program information detector 16 detects broadcasting program information from a broadcasting signal received in real time from the broadcasting station, or detects the program information from another medium (e.g., a bar code). A recording medium information detector 20 detects the type and residual quantity of a recording medium 14 on which a television program is to be recorded. An image compressor 10 compresses an image signal of the television program according to an image compression ratio control signal from a controller 18. A recording signal processor 12 records the compressed image signal of the television program from the image compressor 10 on the recording medium 14 according to a recording control signal from the controller 18. The controller 18 generates the image compression ratio signal and the recording control signal to record the television program based on the particular image compression ratio.

In operation, the program information detector 16 detects the broadcasting program information from the broadcasting signal transmitted in real time from the broadcasting station, or scans a bar code to detect therefrom the program information. In the meantime, a user can choose a desired television program by means of an interface such as a remote controller. Then, the controller 18 detects a running time of the television program to be recorded from the broadcasting program information by means of the program information detector 16, and detects the residual quantity of the recording medium 14 by means of the recording medium information detector 20, to determine an optimal image compression ratio. The video recording apparatus records the television program on the recording medium 14 with the determined optimal image compression ratio.

For example, an MPEG2 (Moving Picture Experts Group 2) compression module with a variable bit rate continuously varies the bit rate of an image according to the residual quantity of the recording medium and the running time of the television program. For example, the image signal of a normal image is encoded with a normal bit rate, the image signal of a complex image is encoded with a higher bit rate, and the image signal of a simple image is encoded with a lower bit rate. In this manner, it is possible to enhance a quality of the image, and adjust the recording time. That is, the controller 18 detects the residual quantity of the recording medium 14 and the running time of the television program, to determine an optimal average bit rate (or an optimal image compression ratio). Then, the video recording apparatus records the television program based on the optimal image compression ratio, to make the best use of the residual quantity of the recording medium 14.

In continuously varying the bit rate, the MPEG2 compression module continuously changes the image compression ratio during the recording of the television program. Concretely, pixels in this simple image are varied only to a small degree compared with the adjacent pixels, whereas the pixels in the complex image are varied to a greater extent. Through analyzing variation degrees as stated above, the complex image, the normal image, and the simple image can be distinguishable. In particular, the present invention sets the image compression ratio based on the residual quantity of the recording medium and the running time of the television program. In the real recording operation, on the basis of the set image compression ratio, the MPEG 2 compression module can assign a higher image compression ratio to the simple image, a middle image compression ratio to the normal image, and a lower image compression ratio to the complex image.

Figure 2:
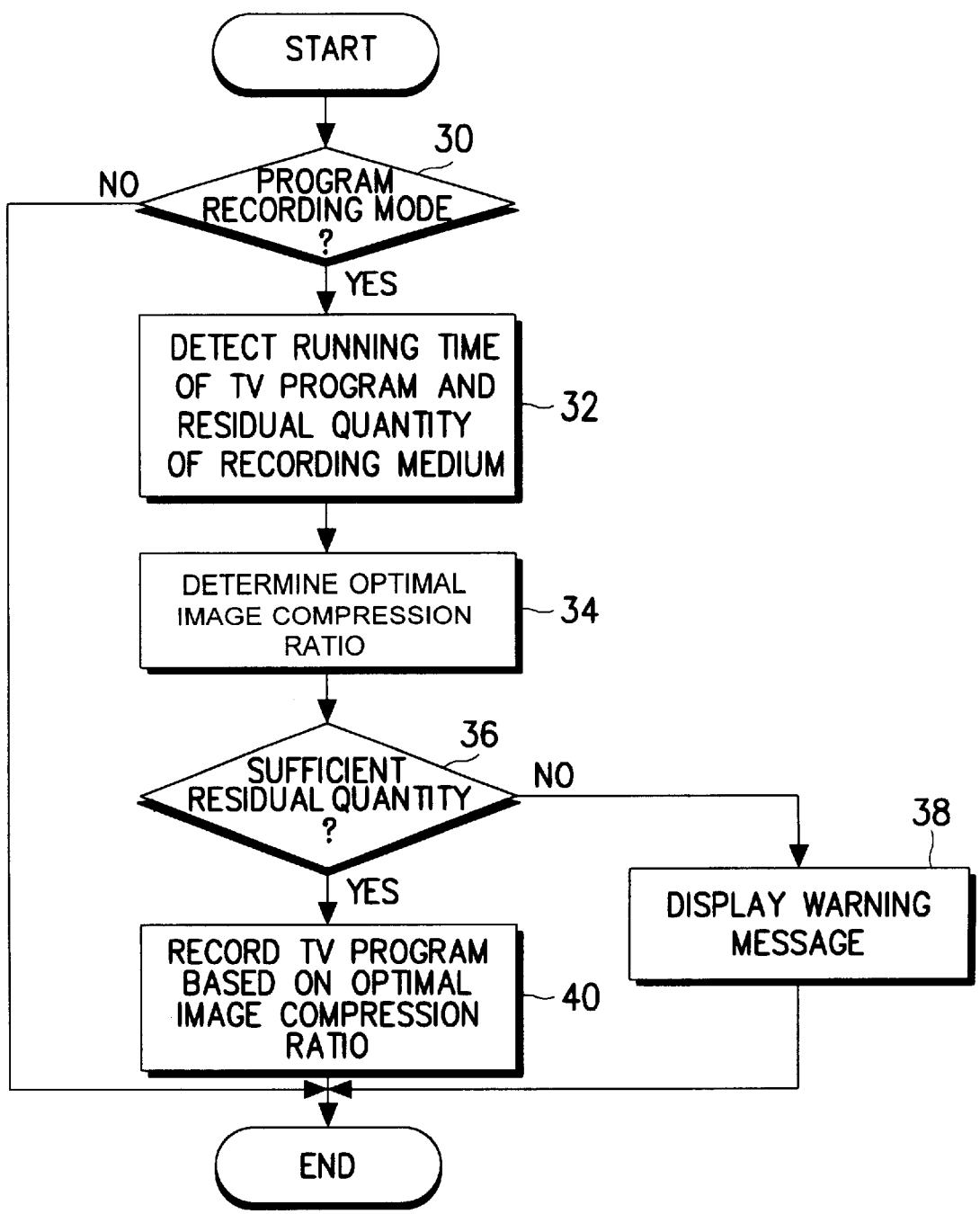
FIG. 2 is a flow chart for recording a television program with an optimal quality on a recording medium according to the embodiment of the present invention.

Now, referring to FIG. 2, the controller 18 checks at a step 30 whether or not the video recording apparatus is set to a program recording mode. If the video recording apparatus is not set to the program recording mode, the procedure will be completed. However, if the video recording apparatus is set to the program recording mode, the controller 18 detects the running time of the television program to be recorded by means of the program information detector 16, and the residual quantity of the recording medium 14 by means of the recording medium information detector 20. Then, at a step 34, the controller 18 determines the optimal image compression ratio based on the running time of the television program and the residual quantity of the recording medium 14. The controller 18 checks at a step 36 whether the residual quantity of the recording medium 14 is sufficient to fully record the television program. As the result, if the residual quantity is too short to fully record the television program, the controller 18 displays at a step 38 a warning message, on a display, that the recording medium 14 lacks the residual quantity. However, if the recording medium 14 has a sufficient residual quantity, the controller 18 records at a step 40 the television program on the recording medium 14 based on the determined optimal image compression ratio.

For instance, on the assumption that an average bit rate for the optimal compression ratio is about 3–5 Mbps, and the image quality begins to degrade at an average bit rate of 3 Mbps and seriously degrades at an average bit rate of 1 Mbps, if the average bit rate for the optimal compression ratio based on the residual quantity of the recording medium 14 and the running time of the television program to be recorded is lower than 1 Mbps, it is considered at the step 36 that the residual quantity of the recording medium 14 is not sufficient.

Furthermore, the video recording apparatus according to another preferred embodiment of the present invention may display a warning message indicating that the image quality may be degraded, if the average bit rate is set between 1–3 Mbps, and thereafter, ask a user whether or not to record the television program nevertheless. If the average bit rate is over 5 Mbps because the residual quantity of the recording medium is more than sufficient as compared to the running time of the television program to be recorded, the video recording apparatus may display a message indicating a sufficiency of the recording medium 14 and ask the user whether or not to record the television program with a high quality.

As can be clearly understood from the foregoing descriptions, the video recording apparatus according to the present invention detects the residual quantity of the recording medium and the running time of the television program to be recorded on the recording medium, to determine the optimal image compression ratio. Then, the video recording apparatus records the television program based on the determined optimal image compression ratio, making the best use of the residual quantity of the recording medium. Therefore, it is possible to record the television program with an optimal quality according to the residual quantity of the recording medium.

Although preferred embodiments of the present invention have been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method for recording a television program in a video recording apparatus, comprising:

receiving broadcasting program information transmitted from a broadcasting station;

detecting a running time of the television program to be recorded from the broadcasting program information;

detecting a residual quantity of a recording medium on which the television program is to be recorded;

comparing said running time of the television program and said residual quantity of the recording medium to determine an optimal image compression ratio;

calculating an optimal bit rate from the optimal image compression ratio; and recording the television program on the recording medium based on the optimal image compression ratio based upon received portions of the television program.

2. A method for recording a television program according to claim 1, further comprising the step of displaying a warning message, if said residual quantity is not sufficient to record the television program.

3. A method for recording a television program in a video recording apparatus, comprising:

receiving broadcasting program information transmitted from a broadcasting station;

detecting a running time of the television program to be recorded from the broadcasting program information;

detecting a residual quantity of a recording medium on which the television program is to be recorded;

comparing said running time of the television program and said residual quantity of the recording medium to determine an optimal image compression ratio;

recording the television program on the recording medium based on said optimal image compression ratio;

displaying a warning message, if said residual quantity is not sufficient to record the television program; and asking a user whether to record the television program, even though the residual quantity is not enough to record the television program so as to allow the user to record the television program even though the residual quantity is not enough to record the television program.

4. A method for recording a television program according to claim 1, further comprising the step of asking a user whether to record the television program at a high quality, if the residual quantity is sufficient to record the television program.

5. A method for recording a television program in a video recording apparatus, comprising:

receiving broadcasting program information transmitted from a broadcasting station;

detecting a running time of the television program to be recorded from the broadcasting program information;

detecting a residual quantity of a recording medium on which the television program is to be recorded;

comparting said running time of the television program and said residual quantity of the recording medium to determine an optimal image compression ratio;

recording the television program on the recording medium based on said optimal image compression ratio;

asking a user whether to record the television program at a high quality, if the residual quantity is sufficient to record the television program; and asking a user whether to record the television program, even though the residual quantity is not enough to record the television program.

6. A video recording apparatus for recording a television program on a recording medium, comprising:

a program information detector to receive broadcast program information transmitted from a broadcasting station, the broadcast program information including a running time of the television program to be recorded;

a recording medium information detector to determine a residual quantity remaining of the recording medium for recording;

a controller to determine an image compression ratio based upon the running time and the residual quantity; to determine an average bit rate from the average image compression ratio, and to change an image compression ratio for received portions of the television program; and a recording unit to record the television program on the recording medium based upon the image compression ratio and the average bit rate.

7. A video recording apparatus as claimed in claim 6, wherein said program information detector receives the running time and said recording unit receives the television program as broadcast signals.

8. A video recording apparatus as claimed in claim 6, wherein said program information detector receives the running time from a bar code and said recording unit receives the television program as a broadcast signal.

9. A video recording apparatus for recording a television program on a recording medium, comprising:

a program information detector to receive broadcast program information transmitted from a broadcasting station, the broadcast program information including a running time of the television program to be recorded;

a recording medium information detector to determine a residual quantity remaining of the recording medium for recording;

a controller to determine an image compression ratio based upon the running time and the residual quantity;

anda recording unit to record the television program on the recording medium based upon the image compression ratio, wherein said controller determines a bit rate for the image compression ratio, compares the bit rate with a predetermined bit rate, controls said recording unit to record the television program on the recording medium if the bit rate is at least as great as the predetermined bit rate, and controls said recording unit to not record the television program on the recording medium if the bit rate is less than the predetermined bit rate.

10. A video recording apparatus as claimed in claim 9, wherein the predetermined bit rate is approximately 1 Mbps.

11. A video recording apparatus as claimed in claim 9, wherein said controller generates a warning if the bit rate is less than the predetermined bit rate.

12. A video recording apparatus as claimed in claim 9, wherein said controller determines whether the bit rate is between the predetermined bit rate and a predetermined second bit rate, requests whether to record the television program from a user if the bit rate is between the predetermined bit rate and the predetermined second bit rate, and controls said recording unit to record the television program on the recording medium if the user responds positively to the request.

13. A video recording apparatus for recording a television program on a recording medium comprising:

a program information detector to receive broadcast program information transmitted from a broadcasting station, the broadcast program information including a running time of the television program to be recorded;

a recording medium information detector to determine a residual quantity remaining of the recording medium for recording;

a controller to determine an image compression ratio based upon the running time and the residual quantity; and a recording unit to record the television program on the recording medium based upon the image compression ratio, wherein said controller determines a bit rate for the image compression ratio, compares the bit rate with predetermined first and second bit rates, the predetermined second bit rate being higher than the predetermined first bit rate, and said controller indicates that there is sufficient recording space on the recording medium if the bit rate is at least as great as the predetermined second bit rate, and requests whether to record the television from a user based upon the sufficient recording space indicator, indicates that degradation will occur if the bit rate is between the predetermined first and second bit rates, and requests whether to record the television program from the user based upon the degradation indicator.

14. A video recording apparatus as claimed in claim 13, wherein the predetermined first bit rate is approximately 1 Mbps and the predetermined second bit rate is approximately 3 Mbps.

15. A video recording apparatus as claimed in claim 6, wherein the recording medium is a video cassette recorder.

16. A video recording apparatus as claimed in claim 6, wherein the recording medium is a digital versatile disc.

17. A video recording apparatus as claimed in claim 6, wherein said controller determines complexities of images of the television program, and adjusts the image compression ratio based upon the complexities of the images.

18. A video recording apparatus as claimed in claim 17, wherein said controller varies pixels in a simple one of the images to a first extent as compared with adjacent pixels, and varies pixels in a more complex image to a second greater extent as compared with adjacent pixels.

19. A method of recording a television program on a recording medium, comprising the steps of:
   receiving a running time of the television program to be recorded;
   determining a residual quantity remaining of the recording medium for recording;
   determining an image compression ratio based upon the running time and the residual quantity;
   recording the television program on the recording medium based upon the image compression ratio;
   determining a bit rate for the image compression ratio;
   comparing the bit rate with a predetermined bit rate; and
   recording the television program on the recording medium if the bit rate is at least as great as the predetermined bit rate, and not recording the television program on the recording medium if the bit rate is less than the predetermined bit rate.

20. A method as claimed in claim 19, wherein the predetermined bit rate is approximately 1 Mbps.

21. A method as claimed in claim 19, further comprising the step of generating a warning if the bit rate is less than the predetermined bit rate.

22. A method as claimed in claim 19, further comprising the steps of:
   determining whether the bit rate is between the predetermined bit rate and a predetermined second bit rate;
   requesting whether to record the television program from a user if the bit rate is between the predetermined bit rate and the predetermined second bit rate; and
   recording the television program on the recording medium if the user responds positively to the request.

23. A method of recording a television program on a recording medium, comprising the steps of:
   receiving a running time of the television program to be recorded;
   determining a residual quantity remaining of the recording medium for recording;
   determining an image compression ratio based upon the running time and the residual quantity;
   recording the television program on the recording medium based upon the image compression ratio;
   determining a bit rate for the image compression ratio;
   comparing the bit rate with predetermined first and second bit rates, the predetermined second bit rate being higher than the predetermined first bit rate;
   indicating that there is sufficient recording space on the recording medium if the bit rate is at least as great as the predetermined second bit rate, and requesting whether to record the television program from a user based upon the sufficient recording space indicator; and
   indicating that degradation will occur if the bit rate is between the predetermined first and second bit rates, and requesting whether to record the television from the user based upon the degradation indicator.

24. A method as claimed in claim 23, wherein the predetermined first bit rate is approximately 1 Mbps and the predetermined second bit rate is approximately 3 Mbps.

25. A video recording apparatus for recording a television program on a recording medium, comprising:
   a program information detector to receive a running time of the television program to be recorded;
   a recording medium information detector to determine a residual quantity remaining of the recording medium for recording;
   a controller to determine an image compression ratio based upon the running time and the residual quantity; and
   a recording unit to record the television program on the recording medium based upon the image compression ratio,
   wherein said controller determines a bit rate for the image compression ratio, compares the bit rate with a predetermined bit rate, controls said recording unit to record the television program on the recording medium if the bit rate is at least as great as the predetermined bit rate, and controls said recording unit to not record the television program on the recording medium if the bit rate is less than the predetermined bit rate.

26. A video recording apparatus as claimed in claim 25, wherein the predetermined bit rate is approximately 1 Mbps.

27. A video recording apparatus as claimed in claim 25, wherein said controller generates a warning if the bit rate is less than the predetermined bit rate.

28. A video recording apparatus as claimed in claim 25, wherein said controller determines whether the bit rate is between the predetermined bit rate and a predetermined second bit rate, requests whether to record the television program from a user if the bit rate is between the predetermined bit rate and the predetermined second bit rate, and controls said recording unit to record the television program on the recording medium if the user responds positively to the request.

29. A video recording apparatus for recording a television program on a recording medium, comprising:
   a program information detector to receive a running time of the television program to be recorded;

a recording medium information detector to determine a residual quantity remaining of the recording medium for recording;

a controller to determine an image compression ratio based upon the running time and the residual quantity; and a recording unit to record the television program on the recording medium based upon the image compression ratio, wherein said controller determines a bit rate for the image compression ratio, compares the bit rate with predetermined first and second bit rates, the predetermined second bit rate being higher than the predetermined first bit rate, and said controller indicates that there is sufficient recording space on the recording medium if the bit rate is at least as great as the predetermined second bit rate, and requests whether to record the television from a user based upon the sufficient recording space indicator, indicates that degradation will occur if the bit rate is between the predetermined first and second bit rates, and requests whether to record the television program from the user based upon the degradation indicator.

30. A video recording apparatus as claimed in claim 29, wherein the predetermined first bit rate is approximately 1 Mbps and the predetermined second bit rate is approximately 3 Mbps.

31. A method for recording a television program in a recording apparatus, comprising:

receiving broadcasting information;

detecting a running time of the television program to be recorded from the broadcasting information;

detecting a residual quantity of a recording medium on which the television program is to be recorded;

comparing said running time of the television program and said residual quantity of the recording medium to determine a calculated image quality;

displaying a message if said residual quantity is not sufficient to record the television program and if the calculated image quality is not a predetermined image quality prior to receiving the television program to be recorded; and requesting from a user whether to record the television program based upon the calculated image quality if said residual quantity is not sufficient to record the television program.

32. A method for recording a television program in a recording apparatus, comprising:

receiving broadcasting information;

detecting a running time of the television program to be recorded from the broadcasting information;

detecting a residual quantity of a recording medium on which the television program is to be recorded;

comparing said running time of the television program and said residual quantity of the recording medium to determine a calculated image quality;

displaying a message indicative that the residual quantity is not sufficient to record the television program if the calculated image quality is not a predetermined image quality prior to receiving the television program to be recorded; and requesting from a user whether to record the television program based upon the calculated image quality if said residual quantity is not sufficient to record the television program.

33. A controller readable medium encoded with processing instructions for implementing a method of recording a television program in a recording apparatus performed by the controller, the method comprising:

detecting a running time of the television program to be recorded from the broadcasting program information;

detecting a residual quantity of a recording medium on which the television program is to be recorded;

comparing the running time of the television program and the residual quantity of the recording medium to determine an optimal image compression ratio prior to receiving the television program to be recorded;

changing an image compression ratio for received portions of the television program; and recording the television program on the recording medium based on the optimal image compression ratio and the changed image compression ratio for the received portions of the television program.

34. The controller readable medium of claim 33, the method further comprising displaying a warning message, if the residual quantity is not sufficient to record the television program.

35. The controller readable medium of claim 33, the method further comprising asking a user whether to record the television program at a high quality, if the residual quantity is sufficient to record the television program.

36. The controller readable mediun of claim 36, the method further comprising asking a user whether to record the television program, even though the residual quantity is not enough to record the television program.

37. The controller readable medium of claim 35, the method further comprising asking a user whether to record the television program, even though the residual quantity is not enough to record the television program.

38. The controller readable medium of claim 33, the method further comprising:

determining an image compression ratio based upon the running time and the residual quantity;

determining a bit rate for the image compression ratio;

comparing the bit rate with a predetermined bit rate; and said recording the television program comprises recording the television program on the recording medium if the bit rate is at least as great as the predetermined bit rate, and not recording the television program on the recording medium if the bit is less than the predetermined bit rate

* * * * *

UNITED STATES PATENT AND TRADEMARK OFFICE
CERTIFICATE OF CORRECTION

PATENT NO. : 6,804,451 B1
DATED : October 12, 2004
INVENTOR(S) : Jung-Wan Ko et al.

It is certified that error appears in the above-identified patent and that said Letters Patent is hereby corrected as shown below:

Column 5,
Line 8, insert -- and the optimal bit rate while changing an image compression ratio from the optimal image compression ratio -- before "based".

Column 6,
Line 4, insert -- average -- before "image"
Line 58, insert -- , -- after "medium".

Column 10,
Line 14, insert -- detecting broadcasting program information transmitted from a broadcasting system; --
Line 36, change "36" to -- 34 --.

Signed and Sealed this

Third Day of May, 2005

JON W. DUDAS
*Director of the United States Patent and Trademark Office*